United States Patent [19]

Roden et al.

[11] 3,865,627

[45] Feb. 11, 1975

[54] MAGNETIC RECORDING MEDIUM INCORPORATING FINE ACICULAR IRON-BASED PARTICLES

[75] Inventors: John S. Roden, White Bear Lake; Kent A. Kirkevold, Woodbury; Gary L. Tritle, Roseville; Gene A. Sjerven, Saint Paul, all of Minn.

[73] Assignee: Minnesota Mining and Manufacturing Company, St. Paul, Minn.

[22] Filed: May 22, 1972

[21] Appl. No.: 255,262

[52] U.S. Cl. ............ 117/240, 117/100 M, 117/235, 252/62.54

[51] Int. Cl. ............................................ H01f 10/02

[58] Field of Search ........................... 117/234–240, 117/100 B, 100 M; 252/62.54

[56] References Cited

UNITED STATES PATENTS

| | | | |
|---|---|---|---|
| 3,595,694 | 7/1971 | Akai et al. | 117/240 X |
| 3,630,910 | 12/1971 | Akashi et al. | 117/240 X |
| 3,632,512 | 1/1972 | Miller | 117/100 X |
| 3,653,962 | 4/1972 | Akashi et al. | 117/240 |

FOREIGN PATENTS OR APPLICATIONS

| | | | |
|---|---|---|---|
| 761,451 | 11/1956 | Great Britain | 117/240 UX |

*Primary Examiner*—William D. Martin
*Assistant Examiner*—Bernard D. Pianalto
*Attorney, Agent, or Firm*—Alexander, Sell, Steldt & DeLaHunt

[57] ABSTRACT

Magnetic recording medium incorporating fine acicular iron-based magnetizable particles dispersed in a nonmagnetizable binder and providing high output signals with high signal/noise ratios. The particles may also have an outer layer that comprises a chromium and oxygen-containing compound.

8 Claims, 2 Drawing Figures

MAGNETIC RECORDING MEDIUM INCORPORATING FINE ACICULAR IRON-BASED PARTICLES

BACKGROUND OF THE INVENTION

Fine, acicular, iron-based, metal particles are recognized to be potentially superior magnetizable pigments for use in magnetic recording media. Such particles may be made with both high saturation magnetic moments and high magnetic coercivities, and the result is that magnetic recording media incorporating the particles should be capable of much higher output than magnetic recording media that incorporate conventional gamma-ferric oxide particles.[1]

1. Iron-based metallic particles were suggested as a magnetizable pigment in the earliest days of magnetic recording; see Kirkegaard, U.S. Pat. No. 900,392 (1908), where steel filings, steel pins, or bits of steel wire were suggested as magnetizable pigments. However, the large, irregular, and low-coercivity steel particles suggested by Kirkgaard probably could not have made a commercially successful recording media; and by the time magnetic recording technology was ready for serious development, rather inexpensive iron oxide particles with adequate magnetic properties had been developed (see Camras, U.S. Pat. No. 2,694,656 (1954)).
However, research in iron-based metal particles continued, much of it directed to use of such particles in compacted form as permanent magnets but some also to the use of the particles as magnetizable pigments in magnetic recording media. Best, U.S. Pat. No. 1,847,860 (1932), suggested "colloidal" iron particles, and Oexmann, U.S. Pat. No. 2,041,480 (1936), very fine carbonyl iron particles (iron particles prepared by thermal decomposition of iron carbony), as magnetizable pigments in magnetic recording media. Fabian et al, U.S. Pat. No. 2,884,319 ( 1959) pointed out that iron-based metal particles should be acicular to improve their magnetic properties and taught a method for making acicular particles by decomposing iron carbonyl in a magnetic field. Paine et al, U.S. Pat. No. 2,974,104 (1961) discussed the need for acicular iron-based particles to have a diameter about the size of a single magnetic domain and suggested making acicular iron or iron-cobalt particles of that diameter by precipitating the particles from a solution into a quiescent mercury electrode. A different method for making fine acicular iron-based particles taught in a series of patents is based on solution-reduction techniques using alakali metal borohydrides: Miller et al., U.S. Pat. No. 3,206,338 (1965), describes such a method for making fine acicular metal particles primarily of iron, cobalt, and nickel; Little et al., U.S. Pat. No. 3,535,104 (1970) describes a method for making such particles that also include chromium; and Graham et al., U.S. Pat. No. 3,567,525 (1971) describes a method for modifying the magnetic properties of such particles by heat-treatment. Other discussions of magnetic recording media incorporating fine iron-based particles are represented by such patents as Japanese Patent publication Nos. 64/19282 and 65/5349.

However, the full potential of fine acicular iron-based particles is not realized simply by providing magnetic recording media capable of high output. For most magnetic recording applications, a gain in output is of little value if there is not also a significant gain in signal/noise ratio (the difference, in decibels, between the level of output and the level of noise, the latter being spurious unwanted signals such as those audible as noise from recorded audible range tapes or visible as picture disruptions from recorded video tapes).

Prior-art teachings concerned with fine acicular iron-based particles generally do not discuss signal/noise ratios, but our work shows that attaining desired signal/noise ratios with such particles is a major challenge. For example, we have found that seemingly useful magnetic properties of the particles (such as high magnetic moment) will prevent desired signal/noise ratios under some conditions. Other problems arise because of the size of the particles (the very small size and large surface area of the particles increases reactivity, which, among other things, can cause the particles to interact and to react with binder material to prevent the kind of dispersions of particles in binder material needed to minimize noise; at the same time, under certain conditions, some particles, even though very small, are too large to permit low noise).

None of the prior-art teachings concerned with fine acicular iron-based particles deals with the aforementioned problems that hinder the improvement of signal/noise ratios, and insofar as our work reveals, magnetic recording media prepared according to those teachings would not be high-performance recording media capable of both desirably high outputs and high signal/noise ratios. And as a partial corollary, fine acicular iron-based particles have continued until this invention to be only "potentially" useful magnetizable pigments for magnetic recording media.

SUMMARY OF THE INVENTION

Briefly, a magnetic recording medium of the invention comprises a magnetizable layer carried on a non-magnetizable support, the magnetizable layer comprising fine acicular ferromagnetic particles[2] that (1) comprise at least about 75 weight-percent metal, at least a majority of the metal being iron and any other metal ingredient that comprises at least 10 weight-percent of the metal being selected from cobalt, nickel, and chromiun; (2) exhibit a saturation magnetic moment ($\sigma_s$) of at least 75 electromagnetic units/gram; and (3) exhibit an average diameter[3] and a saturation intensity of magnetization ($I_s$, the product of the saturation magnetic moment of the particles and their density) approximately equal to or less than the co-ordinates for a point on the curve of FIG. 1. The particles are uniformly, thoroughly, and compatibly dispersed in the binder material, with sufficient particles being included so that the recording medium exhibits a remanent flux density of greater than 1,500 gauss.

2. While the term "acicular particle" is used herein, as well as in the prior literature, such "particles" may in fact comprise a linear assemblage of smaller, generally equant particles held together by magnetic forces and acting as a single body for magnetic purposes. The term "acicular particle" is used herein to describe acicular structures that are mechanically a single particle as well as a magnetic assemblage of several particles, having a length-to-diameter ratio greater than about two, and exhibiting uniaxial magnetic anisotropy; preferred particles have a length-to-diameter ratio greater than 4 or 5.

3. By "average diameter," we mean the transverse dimension of the acicular particles, which provides a valid indication of the size of the particles for most purposes; where an acicular particle comprises an assemblage of generally equant particles, the "average diameter" of the acicular particle is the average diameter of the generally equant particles in the assemblage.

As a specific illustration of the improvements provided by the invention, a magnetic recording medium of the invention is typically capable of 10–12 decibels more saturated 0.1-mil-wavelength output than a standard prior-art gamma-ferric-oxide recording medium. While achieving that improvement in output, a magnetic recording medium of the invention routinely exhibits a signal/noise ratio more than 6 decibels better than that of the standard prior-art gamma-ferric-oxide recording medium, and some recording media of the invention exhibit 8 decibels or more improvement (a standard gamma-ferric-oxide reference tape used in the industry, and which will be used herein, is "Scotch" Brand No. 888 magnetic recording tape, which comprises a 0.21-mil-thick magnetizable layer on a 0.92-mil-thick polyethylene terephthalate backing and has a coercivity of 290 oersteds, a remanent flux density of 960 gauss and a remanence of 0.32 lines/¼-inch width as measured in a 60-hertz, 1,000-oersted applied field using an M versus H meter).

The advantages of the invention are especially significant for short-wavelength (0.1-mil-wavelength or less) recording, which makes possible the recording of more information on a given area of recording medium, permits reduction in the rate of travel of the recorded medium through reproduction apparatus, and permits reduction in track width of recorded signals. In addition, however, recording media of the invention have improved output at long wavelengths, and, in fact, they have improved output over the whole band of wavelengths that presently can be recorded on and reproduced from magnetic recoring media.

Figure 1:
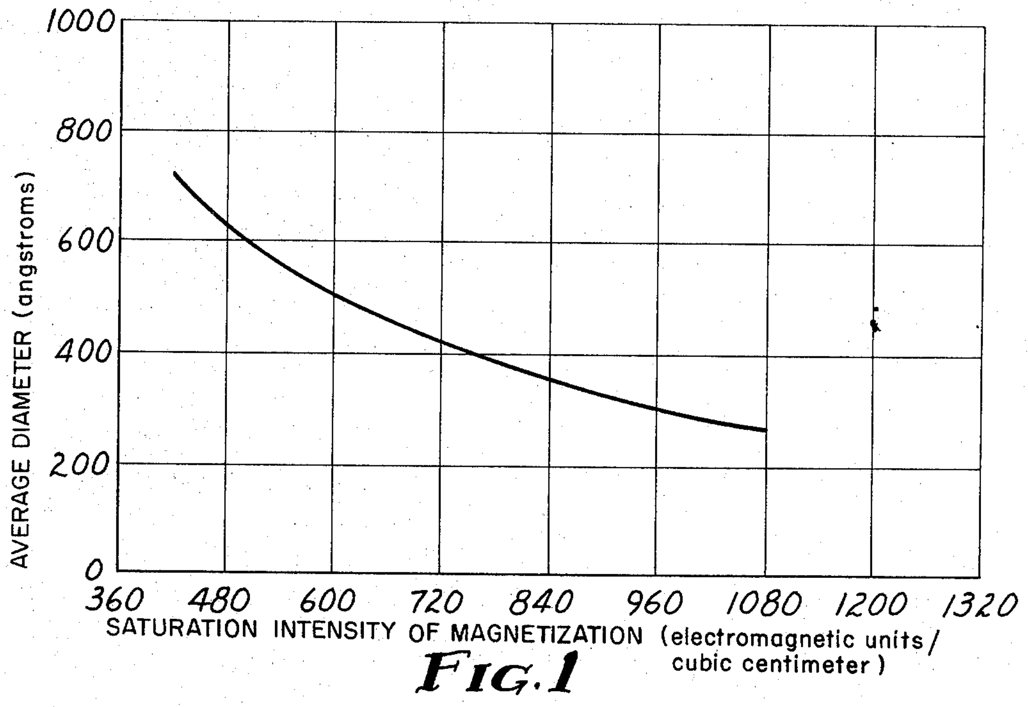
FIGS. 1 and 2 are graphs based on experimental work that we conducted which showed a relationship between the average diameter of fine acicular iron-based ferro-magnetic particles, the saturation intensity of magnetization of the particles, and the signal/noise ratio of a magnetic recording medium in which the particles are the magnetizable pigment. More specifically, we found that the described 6-decibel improvement in the signal/noise ratio of a magnetic recording medium incorporating fine acicular iron-based particles cannot be attained if the average diameter and saturation intensity of magnetizabtion of the particles are greater than certain maximum values. We also found that the diameter and saturation intensity of magnetization are interrelated, so that the higher the intensity of magnetization of the particles, the lower the diameter must be to obtain the desired signal/noise ratio, and vice versa.
Figure 2:
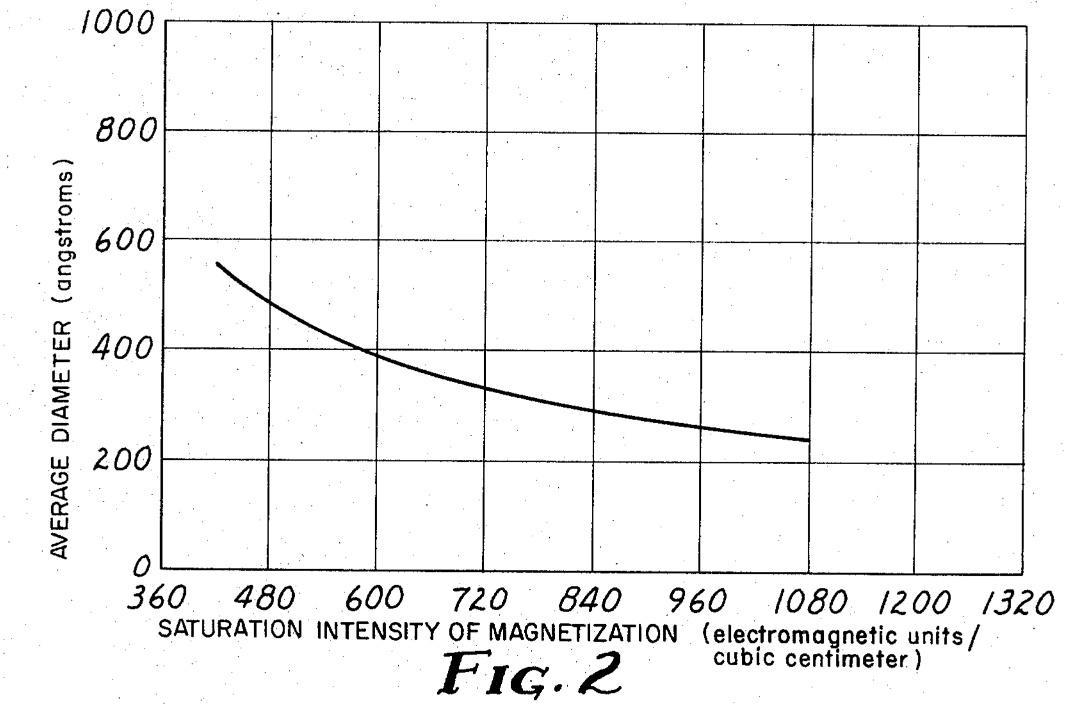

These discoveries are expressed in FIGS. 1 and 2, in which average diameter for fine acicular iron-based particles is plotted in angstroms on the vertical axis, and saturation intensity of magnetization for the particles is plotted in electromagnetic units/cubic centimeter on the horizontal axis. The curve of FIG. 1 shows the values for average diameter and saturation intensity of magnetization needed to obtain the described 6-decibel improvement in signal/noise ratio. That is, points on or under the curve of FIG. 1 represent values of average diameter and saturation intensity of magnetization that will provide the 6-decibel improvement; points above the line represent values that will not provide the 6-decibel improvement. Thus, to obtain the described 6-decibel improvement in signal/noise ratio, the average diameter and saturation intensity of magnetization for the particles in the recording medium should be about equal to or less than the coordinates for a point on the curve of FIG. 1. (The data on which the curves are specifically based are for our presently optimized high-output magnetic recording tape constructions which exhibit a ratio of remanent magnetic flux to maximum magnetic flux ($M_r/M_m$) of 0.8 and are loaded with about 42 volume-percent particles.

By selecting particles having an average diameter and saturation intensity of magnetization about equal to or less than the coordinates for a point on the curve of FIG. 2, recording media exhibiting an 8 decibel improvement in signal/noise ratio should be attainable.

DETAILED DESCRIPTION

Fine acicular iron-based particles useful in the invention may be made in a variety of sizes within the range established by the curves of FIGS. 1 and 2. In general, the smaller the diameter of the particles, the higher will be their coercivity, except that iron-based particles may become superparamagnetic when of a size less than about 120 angstroms. High coercivities are often desired because they make possible higher outputs; but the particles may also be made with less than peak coercivity in order to tailor a magnetic recording medium for specific uses. To obtain coercivities greater than about 500 oersteds, making the particles useful, for example, in magnetic recording media that can be used in certain newer high-performance recording systems, the particles should generally have an average diameter less than about 800 angstroms; to obtain coercivities greater than 850 oersteds, making the particles useful in certain kinds of mastering tapes such as used in "contact-duplication" of video tapes, the particles should have an average diameter less than about 450 angstroms; and to obtain coercivities of greater than 1,000 oersteds, making the particles useful in magnetic recording media to be used for high-density storage, the particles should have an average diameter less than about 400 angstroms.

The saturation magnetic moment ($\sigma_s$) of the particles varies depending on the particular metal ingredients of the particles and on the amount of oxidation of the particles. In order to have desirable remanent flux densities ($B_r$) in magnetic recording media, the particles should have a saturation magnetic moment of at least 75 electromagnetic units/gram (all saturation magnetic moment values used herein are obtained in a 3,000-oersted, 60-hertz applied field and measured by a plot of moment (M) versus coercivity (H) on an M-versus-H meter). To obtain high remanent flux densities with lower loadings of particles, the saturation magnetic moment of the particles should be greater than 100 electromagnetic units/gram and preferably greater than 120 electromagnetic units/gram.

The principles on which the curves of FIGS. 1 and 2 are based generally apply independently of the particular composition of particles. However, the present invention is directed to iron-based particles, which exhibit an inherently higher magnetic moment than particles that are principally based on other common magnetizable metals such as cobalt or nickel. Of the metal ingredients in particles of the invention, at least a majority is iron, and preferably at least about 75-weight-percent, and more preferably at least about 85-weight-percent, is iron. And the particles should comprise at least about 75 weight-percent metal, preferably at least 80 weight-percent metal, and when it can be practicably achieved, 85 or 90 weight-percent metal, since the magnetic moment of the particles may be made higher and their properties more uniform by increasing the proportion of metal. The nonmetal portion of the particles generally includes water, oxygen, and other minor ingredients.

Some cobalt or nickel can be useful in the particles. For example, inclusion of some cobalt and/or nickel, especially in particles of the invention prepared by solution-reduction processes using alkali metal borohydride reducing agents, decreases the diameter of the particles, and thus increases coercivity. The diameter is decreased and hence the coercivity is increased significantly by small additions, such as about 0.1 weight-percent, of cobalt or nickel; the coercivity is sufficiently sensitive to additions of cobalt or nickel that the amount of cobalt or nickel can be used as a process control in making particles for use in recording media of the invention. For the highest coercivities, making possible the highest outputs, at least one, and preferably at least two weight-percent of cobalt and/or nickel is included in the particles. Very little further improvement in coercivity is obtained for amounts of cobalt and/or nickel in excess of about 10 weight-percent of the total metal. Increases of cobalt and/or nickel to amounts greater than about 20 or 25 weight-percent of the total metal decrease coercivity, and are even less preferred. Further, the inclusion of cobalt or nickel in particles of the invention decreases magnetic moment, which is usually an additional reason not to employ cobalt and/or nickel in amounts in excess of about 10 weight-percent of the total metal. Nickel decreases magnetic moment more than cobalt and thus is less desirable than cobalt.

When chromium is alloyed into the particles, as in amounts up to about 20 weight-percent, it increases environmental stability. However, such alloy additions of chromium also reduce saturation magnetic moment, and accordingly the particles preferably include less than 5 or 10 weight-percent chromium, and more preferably are substantially free of chromium, as an alloy ingredient; and the preferred values for total chromium, cobalt, and nickel alloy ingredients are no more than the preferred maximums for cobalt and/or nickel given above (as discussed later, inclusion of chromium not as an alloy ingredient, but in an outer shell around the particles, also improves environmental stability, but does not significantly reduce the magnetic moment; the amount of chromium in such a shell generally comprises less than 5 weight-percent of the particle). In addition to such metals as cobalt, nickel, and chromium, which can be (but preferably are not) included as alloy ingredients in individual or aggregate amounts greater than 10 weight-percent of the total metal, other metals may be included in lesser amounts than 10 weight-percent. For example, boron is inherently included in particles prepared by a metal borohydride process. However, in no case are ingredients included such that the saturation magnetic moment of the particles falls below about 75 electromagnetic units/gram, and preferably, as noted above, not below 100 electromagnetic units/gram.

Solution-reduction methods using alkali metal borohydrides are presently preferred methods for making particles useful in the invention because average particle size and composition can be readily controlled by these methods. In such methods, solutions of iron salts such as ferrous sulfate or ferrous chloride are mixed with solutions of alkali metal borohydrides such as sodium borohydride, preferably in a high shear agitator located in a magnetic field of 500 or more oersteds, whereupon a rapid reaction occurs in which acicular metal particles precipitate from the solution. Salts of such metals as cobalt, nickel, and chromium can also be mixed into the reaction solution to form particles containing those metals. Other known procedures for forming iron-based particles include decomposing iron carbonyl, or mixtures of iron carbonyl and other metal carbonyls, in a thermal decomposition chamber, with or without the influence of a magnetic field; reducing iron oxide particles as by heating in the presence of a reducing gas; and other solution-reduction techniques.

To prepare magnetic recording media of the invention, the fine acicular iron-based particles are uniformly and thoroughly dispersed in a binder material and then the dispersion coated onto a nonmagnetizable support, such as a thin high-strength film, or a highly polished metal disc. Conventionally, it is suggested that iron-based metal particles should be nonpyrophoric when introduced into the binder material, but we prefer to use particles that have not been oxidized to a nonpyrophoric condition; the more thin the shell of oxidation on a particle, we believe, the more uniform will be the magnetic properties of the particles in the recording medium. Whether or not the particles are introduced into the binder material in a pyrophoric or nonpyrophoric form, the environmental stability of the resulting recording medium appears to be the same, and the recording medium is not pyrophoric.

However, environmental stability of magnetic recording media of the invention can be improved by treating the fine acicular iron-based particles to develop a chromium-based outer layer on them before they are introduced into the binder material. The particles are treated with a solution containing dichromate or chromate ions, such as provided by potassium dichromate, as taught in the copending application of Roden, Ser. No. 255,260, filed the same day as this application and now U.S. Pat. No. 3,837,912. It is believed that a shell of metal chromite having the formula $Me_xCr_{3-x}O_4$, where $x$ is approximately 0.85, is formed around the particles as a result of this treatment. Whatever the composition of the outer layer, improved environmental stability has been found to result from the treatment.

Environmental stability is also improved, we have found, by improving the degree of dispersion of the particles in the binder material. Apparently, the more thorough the dispersion, the better the binder material surrounds and protects the particles. Good dispersion appears to be aided by assuring that any treatment or oxidation of the particles before mixture in the binder material is uniform. Thus, high-speed shearing of particles in a treating solution is useful.

A good degree of dispersion is usually accompanied by a good "squareness" exhibited by the recording medium, since the better dispersed the particles, the more thoroughly can they be oriented in an orienting field used in preparing the media (squareness is the ratio of remanent moment to maximum moment ($M_r/M_m$), that is exhibited by the magnetizable particles in the sample recording tape; of course, a good squareness is also desirable in its own right, and other factors, such as the distribution of particle sizes and magnetic properties, also affect squareness). In recording media of the invention in which the particles are oriented (audible, video, and instrumentation recording tapes, for example), the squareness is preferably at least 0.75, and more preferably at least 0.8.

The dispersion of particles in binder material should also be compatible, meaning that the particles and binder material should not unduly interact or react with one another to cause premature crosslinking of the binder material, agglomeration of binder material and particles, or degradation of particles or binder material. In preparing a mixture of the fine acicular iron-based particles in binder material, the particles may be first mixed with a wetting agent and a solvent in a ball mill, sand mill, or the like, after which the resulting paste of material is dispersed in the binder material. A sand mill appears to prepare a more compatible mixture of particles and binder material, perhaps because it has less tendency to break up particles while separating them and thus exposes less particle surface area for reaction with the binder material.

The amount of interaction between the particles and binder material may be measured by calorimetry. In one test, the binder material and solvents to be used in making a contemplated tape are mixed with the grind paste (generally comprising a mixture of magnetizable particles, dispersing agent, and solvent dispersed in whatever mill is to be used in preparing the tape) in proportions such as to give a ratio of 10–20 parts by weight of nonmagnetizable solids to 1 part by weight of particles; the mixing takes place in an L.K.B. Precision Calorimeter Model 8700A made by LKB Producter AB, and the amount of heat given off during mixing is measured. In a second test, a sample of a dried coating peeled from a Teflon sheet comprised of 1 part by weight nonmagnetizable solids and 4 parts by weight particles is placed in a Perkin-Elmer Differential Scanning Calorimeter Model 1–B. The temperature in the calorimeter, which is 25°C when the coating is placed in it, is first decreased to 10°C and then increased at the rate of 20°C/minute to 150°C. For preferred binder materials, less than 10 calories are given off in the first test per gram of particles in the test mixture; and in the second test the area under a curve plotting heat evolved versus the applied temperature is less than 10 calories per gram of particles in the coating. More preferably the test mixture will give off less than 5 calories in the first test per gram particles in the test mixture, and the area under the curve in the second test will be less than 5 calories per gram of particles in the coating. Among the binder materials found useful in this procedure have been materials based on certain polyurethane polymers, vinyl chloride-based polymers, and epoxy resins. Of these, the binder materials that react with a chemical crosslinking agent to become crosslinked are presently preferred, because they appear to provide more environmental protection for particles within a coating of the material as well as improved mechanical strength and durability.

The particles should be included in the binder material in an amount sufficient to provide a remanent flux density in an oriented recording medium of at least 1,500 gauss as measured in a 3,000-oersted, 60-hertz magnetic field. Preferably sufficient particles are included to make the remanent flux density at least 2,000 gauss, more preferably at least 2,500 gauss, and even more preferably at least 3,000 gauss, since higher outputs are thus obtained. To obtain high-performance recording media exhibiting such high remanent flux densities requires that the particles be well-dispersed and have good magnetic properties. By using high-moment particles, a remanent flux density of 1,500 gauss can be obtained with a low amount of particles, such as 15 volume-percent of the magnetizable layer, making possible a superior durability for the magnetizable layer. But to obtain the best magnetic recording properties, the amount of particles in the magnetizable layer of the invention is preferably at least about 40 volume-percent.

The mixture of particles and binder material is coated and oriented by standard techniques for preparing magnetic recording media, and the surface of the magnetizable layer may be further smoothed by polishing according to standard procedures. To obtain desirable signal/noise ratios, the exterior surface of the magnetizable layer should be quite smooth, having a surface roughness of less than 10 microinches, and preferably less than 5 microinches, peak-to-peak as measured by a Bendix "Proficorder" having a 0.0001-inch-diameter stylus and with a stylus pressure of 20 grams. When the magnetizable layer of a recording medium of the invention is capable of such smoothness, it indicates that a good compatible dispersion of the particles has been obtained. Smoothness is also improved by choosing solvents such that the binder material remains soluble in the solvent system during the whole coating and drying operation, so as to prevent premature precipitation of the binder material, and by controlling the surface tension of the coated binder material, as by use of leveling agents in the binder material.

The invention will be further illustrated by the following examples:

EXAMPLE 1

Two solutions are prepared, one comprising 22.9 pounds of $FeSO_4.7H_2O$ (A.R. grade) and 1.91 pounds of $CoSO_4.7H_2O$ (A.R. grade) in 10 gallons of deionized room-temperature water; and the other comprising 6.61 pounds of sodium borohydride (over 98 percent pure, made by Ventron) and 10 gallons of a solution formed by mixing deionized, room-temperature water with about 15 milliliters of a one-molar solution of sodium hydroxide.

The two solutions are then pumped through conduits at equal reactant concentrations rates so that they impinge on a 2-½-inch-diameter plastic (Teflon) disc which is spinning at about 300 revolutions per minute to assure rapid intimate mixing. The disc is mounted transversely inside a vertical three-inch-diameter glass tube which, in turn, is located inside the core of a large barium-ferrite permanent magnet so that the magnetic field at the point of impingement is 800 oersteds. The solutions react very rapidly and exothermically to produce a highly viscous slurry containing fine black metal particles and having a temperature of 60°C and a pH of 6. The total time required to pump all of the two solutions together is 40 minutes.

During the reaction period the collected slurry of particles (about 30 gallons) is continuously transferred to a 250-gallon stainless steel wash tank already about four-fifths full of deionized water which is continuously agitated by a propeller mixer. After all of the collected slurry has been transferred to the wash tank, the black metal particles are allowed to settle, after which the liquid above the settled particles, which contains soluble reaction-by-products, is drawn off. The particles are then washed by refilling the vessel with deionized water and drawing the water off a total of three times; the conductivity of the final wash water is 340 microhmos, and about 35 gallons of concentrated slurry remains in the bottom of the tank.

A room-temperature solution is then prepared by mixing 0.708 pound of potassium dichromate in 5 gallons of deionized water, and this solution is added to the concentrated slurry, making about 40 gallons of mixture in the tank. This mixture is rapidly agitated using a propeller mixer for five minutes, after which it is diluted to 250 gallons by addition of deionized water. The particles are allowed to settle, the water drained off, the sample washed a second time with an equal amount of water, and the second wash water, which has a conductivity of 48 micromhos, removed.

The remaining contents of the tank are pumped into an eight-plate frame-and-plate press and pressed to a cake about 2.6 gallons in size. Fifteen gallons of technical-grade acetone are pumped through the cake, after which the cake is transferred into three one-gallon cans which are then placed opened in a vacuum oven. The oven is evacuated to a pressure of about 50 millimeters mercury, heated to 150°C, and held at that temperature for 40 hours. The oven is then allowed to cool to room temperature while maintaining the vacuum, after which the oven pressure is increased to atmospheric pressure by purging the oven with nitrogen gas. At this point the magnetizable particles produced are dry and highly pyrophoric. The oven is opened and the cans quickly covered with lids while a strong nitrogen purge is maintained. The cans are stored in a glove box which is maintained under constant positive nitrogen pressure. Chemical analysis of a sample of the particles reveals that they comprise 73.6 percent iron, 6.6 percent cobalt, 3.58 percent chromium, and 2.02 percent boron.

A dispersion of the particles in binder material is then prepared. First, a 1-gallon porcelain jar mill which contains 28.2 pounds of ¼-inch-diameter steel balls is placed in the glove box, and 1.32 pounds of the dry pyrophoric particles of the invention are transferred from one of the cans into the mill. Next, 42 grams of a tridecyl polyethyleneoxide phosphate ester surfactant having a molecular weight of approximately 700 are added to the mill to act as a dispersant together with 526 grams of benzene. The mill is then sealed, removed from the glove box, and placed on a rotary rack, where the mill is rotated for 48 hours at 65 to 70 percent of critical mill speed.

Meanwhile a solution is prepared comprising the following ingredients:

| | Grams |
|---|---|
| 30-weight-percent-solids solution of a high-molecular-weight polyester polyurethane polymer synthesized from neopentyl glycol, poly-epsilon-caprolactone diol, and diphenyl urethane di-isocyanate dissolved in dimethyl formamide | 338 |
| Dimethyl formamide | 408 |
| Methyl ethyl ketone | 164 |
| A 55-weight-percent-solids dispersion of fine alumina particles | 27 |
| 0<br>Fluorochemical surfactant of the type described in U.S. Pat. 3,574,791, Example 17, and useful to provide surface tension control and tape smoothness | 0.08 |

The jar mill is opened and the above solution added, after which the mill is again sealed, placed back on the rack, and rotated for 18 additional hours. Next, the mill contents are poured into another container and 19 grams of a triisocyanate derivative of toluene diisocyanate and 1-di(hydroxymethyl) butanol is added to the mixture to promote polymer crosslinking. The magnetizable particles comprise approximately 44 volume-percent of all of the nonvolatile materials in the mixture.

Immediately after addition of the polyisocyanate, the dispersion is coated by rotogravure techniques onto a 1-mil-thick, smooth polyethylene terephthalate film which has been primed with para-chlorophenol. The wet coating is then oriented in the longitudinal direction using a 1,900-oersted field from a barium-ferrite permanent magnet.

The dried tape is surface-treated or polished by known techniques to give a surface roughness of 2.5–3.0 microinches peak-to-peak (measured as described above). The coating is then post-cured by heating at 230°F for one minute followed by 200°F for one minute. The tape, in which the magnetizable layer is approximately 130 microinches thick, is then slit into standard tape widths.

The magnetic properties of tape prepared as above measured in the presence of a 3,000-oersted 60-hertz field using an M versus H meter were:

$\phi_r$ = 0.679 lines/¼ inch width of tape  $H_c$ = 949 oersted
$M_r/M_m$ = 0.809  $B_r$ = 3280 gauss Next, the saturated output of a tape of this example recorded with 0.1-mil-wavelength signals was measured (using "Scotch" Brand magnetic recording tape No. 888 as the reference tape; the tapes tested were ½-inch-wide, 40-inch-long endless-loop tapes and the tests were performed on a "Mincom" Series-400 recorder-reproducer, modified for 7-track instrumentation heads and transporting the tape at 15 inches per second, with the record head having a gap of 200 microinches, and the playback head having a gap of 40 microinches) and found to be 10.8 decibels better than the reference tape. The tape was bulk-erased using a 3,000-oersted, 60-hertz erase field. A.C.-bulk-erased noise in the band 2.4 to 4.8 kilohertz was measured on the tape (using as the reference a magnetic recording tape having noise characteristics equivalent to those of "Scotch" Brand No. 888 tape; the tapes tested were ¼-inch-wide 40-inch-long endless-loop tapes and the tests were performed on a "Mincom" Series-400 recorder-reproducer, modified for ½-track audio heads and transporting the tape at 7-½ inches per second, with the record head having a gap of 700 microinches and the playback head having a gap of 125 microinches, and using playback equalization of 3,180- and 50-microsecond time-constant) and found to be 3.3 decibels higher than the reference tape, giving a signal/noise ratio of 7.5 decibels greater than the reference tape. When subjected to a 100°F, 80-percent-relative humidity environment for 21 days, the tape lost essentially none of its remanent flux density.

EXAMPLES 2 – 15

Tapes were prepared and then tested for signal output and noise generally as 1 above. Table 1 lists some of the properties of the magnetizable particles used in the various examples and some of the properties of the tapes. Table 2 describes the compositions of the magnetizable particles in each of the examples (as will be noted, the particles in some of the examples included chromium only as an alloy ingredient and in other examples, included chromium only as an ingredient in an outer layer or shell of the particles).

TABLE 1

| | Particle Properties | | | Tape Properties | | | | |
|---|---|---|---|---|---|---|---|---|
| Ex. No. | $H_c$ (oersteds) | Average Diameter (angstroms) | Saturation Magnetic Moment (emu/g) | $H_c$ (oersteds) | $B_r$ (gauss) | Output (decibels) | Noise (decibels) | Signal/Noise Ratio (decibels) |
| 2 | 655 | 640 | 92 | 520 | 1910 | +3.2 | +2.0 | 1.2 |
| 3 | 655 | 640 | 92 | 491 | 2830 | +4.3 | +2.8 | +1.5 |
| 4 | 613 | 680 | 106 | 522 | 2510 | +6.5 | +3.1 | +3.4 |
| 5 | 490 | 1160 | 147 | 447 | 3440 | +6.7 | +5.6 | +1.1 |
| 6 | 612 | 680 | 150 | 552 | 3530 | +7.1 | +7.1 | -0.0 |

TABLE 1 – Continued

| Ex. No. | Particle Properties H$_c$ (oersteds) | Average Diameter (angstroms) | Saturation Magnetic Moment (emu/g) | Tape Properties H$_c$ (oersteds) | B$_r$ (gauss) | Output (decibels) | Noise (decibels) | Signal/Noise Ratio (decibels) |
|---|---|---|---|---|---|---|---|---|
| 7 | 1060 | 300 | 129 | 882 | 2680 | +9.5 | +2.0 | +7.5 |
| 8 | 1060 | 300 | 129 | 883 | 2780 | +9.0 | +1.9 | +7.1 |
| 9 | 1060 | 300 | 129 | 865 | 2850 | +9.6 | +2.4 | +7.2 |
| 10 | 570 | 800 | 138 | 525 | 3440 | +4.5 | +6.8 | −2.3 |
| 11 | 570 | 800 | 138 | 529 | 3140 | +4.7 | +6.7 | −2.0 |
| 12 | 1050 | 300 | 125 | 920 | 2980 | +9.0 | +3.4 | +5.6 |
| 13 | 1050 | 300 | 125 | 915 | 2760 | +11.1 | +3.6 | +7.5 |
| 14 | 745 | 500 | 140 | 638 | 3580 | +8.0 | +5.9 | +2.1 |
| 15 | 1100 | 300 | 117 | 950 | 2880 | +10.5 | +2.3 | +8.2 |

TABLE 2

| Example No. | Iron | Cobalt | Chromium (alloy) | Chromium (shell) | Boron |
|---|---|---|---|---|---|
| | (all values in percent) | | | | |
| 2 | 78.2 | 0.19 | 2.55 | | 2.26 |
| 3 | 78.2 | 0.19 | 2.55 | | 2.26 |
| 4 | 78.3 | 0.22 | 5.16 | | 1.82 |
| 5 | 89.7 | 0.17 | | 3.10 | 1.72 |
| 6 | 82.0 | 0.17 | | 2.85 | 1.53 |
| 7 | 72.4 | 6.71 | | 3.57 | 2.15 |
| 8 | 72.4 | 6.71 | | 3.57 | 2.15 |
| 9 | 72.4 | 6.71 | | 3.57 | 2.15 |
| 10 | 81.2 | 0.16 | | 2.75 | 2.04 |
| 11 | 81.2 | 0.16 | | 2.75 | 2.04 |
| 12 | 70.6 | 6.08 | | 3.21 | 1.88 |
| 13 | 70.6 | 6.08 | | 3.21 | 1.88 |
| 14 | 81.6 | 1.65 | | 3.28 | 1.94 |
| 15 | 72.3 | 6.34 | | 3.89 | 2.22 |

What is claimed is:

1. Magnetic recording medium exhibiting an improved signal/noise ratio comprising a magnetizable layer carried on a nonmagnetizable support, the magnetizable layer comprising a nonmagnetizable organic polymeric binder material and, uniformly thoroughly and compatibly dispersed in the binder material, fine acicular ferromagnetic particles that (1) comprise at least about 75 weight-percent metal, at least a majority by weight of the metal being iron and any other metal ingredient that comprises at least 10 weight-percent of the metal being selected from cobalt, nickel, and chromium, (2) exhibit a saturation magnetic moment of at least 75 electromagnetic units/gram, and (3) exhibit an average diameter and a saturation intensity of magnetization about equal to or less than the coordinate values for a point on the curve of FIG. 1; sufficient ferromagnetic particles being included so that the recording medium exhibits a remanent flux density greater than 1,500 gauss.

2. Magnetic recording medium of claim 1 in which said fine acicular ferromagnetic particles dispersed in the binder material comprise at least 80 weight-percent metal, exhibit a coercivity of at least 850 oersteds, and have a saturation magnetic moment of at least 100 electromagnetic units/gram.

3. Magnetic recording medium of claim 1 in which cobalt comprises between about 0.1 and 10 weight-percent of the metal ingredients.

4. Magnetic recording medium of claim 1 in which the ferromagnetic particles exhibit an average diameter and a saturation intensity of magnetization about equal to or less than the co-ordinate values for a point on the curve of FIG. 2.

5. Magnetic recording tape comprising a magnetizable layer carried on a nonmagnetizable support, the magnetizable layer comprising a nonmagnetizable organic polymeric binder material and, uniformly thoroughly and compatibly dispersed in the binder material, fine acicular ferromagnetic particles that (1) comprise at least about 80 weight-precent metal, at least a majority by weight of the metal being iron and any other metal ingredient that comprises at least 10 weight-percent of the metal being selected from cobalt, nickel, and chromium, (2) exhibit a saturation magnetic moment of at least 100 electromagnetic units/-gram, (3) exhibit a coercivity of at least 850 oersteds, and (4) exhibit an average diameter and a saturation intensity of magnetization about equal to or less than the coordinate values for a point on the curve of FIG. 1; sufficient ferromagnetic particles being included so that the recording tape exhibits a remanent flux density greater than 2,000 gauss, and the recording tape exhibiting when measured as herein described a signal/noise ratio at least 6 decibels better than that of the standard gamma-ferric-oxide recording tape described herein.

6. Magnetic recording medium comprising a magnetizable layer carried on a nonmagnetizable support, the magnetizable layer comprising a nonmagnetizable organic polymeric binder material and, uniformly thoroughly and compatibly dispersed in the binder material, fine acicular ferromagnetic particles that (1) comprise at least about 80 weight-percent metal, at least about 75 weight-percent of the metal being iron and between about 0.1 and 10 weight-percent of the metal being cobalt; (2) have an average diameter of less than about 450 angstroms; (3) have a saturation magnetic moment of at least 100 electromagnetic units/gram, and (4) exhibit an average diameter and a saturation intensity of magnetization about equal to or less than the co-ordinate values for a point on the curve of FIG. 1; sufficient ferromagnetic particles being included so that the recording medium exhibits a remanent flux density of greater than 2,000 gauss, and the recording medium exhibiting when measured as herein described a signal/noise ratio at least 6 decibels better than that of the standard gamma-ferric-oxide recording medium described herein.

7. Magnetic recording medium of claim 6 in which the ferromagnetic particles exhibit an average diameter and a saturation intensity of magnetization about equal to or less than the co-ordinate values for a point on the curve of FIG. 2.

8. Magnetic recording medium exhibiting an improved signal/noise ratio comprising a magnetizable layer carried on a nonmagnetizable support, the magnetizable layer comprising a non-magnetizable organic polymeric binder material and, uniformly thoroughly and compatibly dispersed in the binder material, fine acicular ferromagnetic particles that (1) comprise at least about 80 weight-percent metal, at least about 75 weight-percent of the metal being iron and between about 0.1 and 10 weight-percent of the metal being cobalt; (2) have an average diameter of less than about 450 angstroms; (3) have a saturation magnetic moment of at least 100 electromagnetic units/gram; (4) exhibit an average diameter and a saturation intensity of magnetization about equal to or less than the co-ordinate values for a point on the curve of FIG. 1; and (5) have an outer layer that comprises a chromium- and oxygen-containing compound and that is formed by exposing the particles under high-speed shear-type mixing conditions to a solution containing dichromate or chromate ions and having a ph of up to 7.0, the amount of chromium in said outer layer averaging between 1 and 10 percent of the weight of the particles; sufficient ferromagnetic particles being included so that the recording medium exhibits a remanent flux density of greater than 2,000 gauss.

* * * * *